Patented Aug. 6, 1935

2,010,038

UNITED STATES PATENT OFFICE 2,010,038

CLEANING FLUID

William E. Sharp, Chicago, Ill.; Minnie E. Sharp executrix of the estate of said William E. Sharp, deceased No Drawing. Application September 8, 1931, Serial No. 561,817

13 Claims. (Cl. 87—5)

This invention relates to cleaning fluid and the manufacture thereof by the chlorination of hydrocarbons, and more specifically to the chlorination of propane and/or halogen derivative thereof, and also to the chlorination of hydrocarbons in which propane and/or halogen derivatives thereof is or are present as a principal component or components. The invention also relates to the products obtained, propane chlorides polychlorpropanes, particularly propane trichloride, and chlorinated hydrocarbon mixtures containing propane chlorides, particularly propane trichloride. The invention further relates to compositions of matter containing propane trichloride for use as solvents of organic matter, and for the specific use as a dry cleaning agent. The invention, in addition, relates to a process of dry cleaning in which propane chlorides, particularly propane trichloride, and also mixtures containing an excess of propane chlorides, particularly of propane trichloride, is used as the solvent.

An object of the invention is to provide a process for the chlorination of propane, or of hydrocarbons in which propane is present in excess, in order to produce mixtures of propane chlorides, and specifically propane trichloride.

Another object is to provide a product containing propane trichloride which is highly efficient as a solvent for certain organic matter and as an agent for dry cleaning, the product consisting partly or entirely of propane trichloride.

A further object is to provide a composition of matter for use as a dry cleaning agent that is non-inflammable, non-combustible, non-explosive, and much less toxic than carbon tetrachloride and other commonly used dry cleaning agents, in which propane trichloride is compounded or mixed with other organic solvents.

A still further object is to provide a process of dry cleaning, in which a solvent consisting entirely or partly of propane trichloride is used.

Other objects and advantages of the invention will become apparent to those skilled in the art as the description proceeds.

Propane, either the commercial product, or hydrocarbons containing substantial percentages thereof, either in the liquid or gaseous state, or a low halogen derivative of propane, is subjected to the action of chlorine gas in standard types of apparatus adapted to chlorination processes, such as apparatus made of glass, preferably, but not necessarily, while exposed to sunlight or other forms of actinic rays.

The propane as a gas may be passed through glass vessels containing chlorine gas, or the chlorine gas may be passed through the vessels containing the propane gas, or the two gases may be passed together through the glass apparatus. The chlorination may be continued until the reaction is complete, or it may be conducted in a succession of stages with the recovery of the chlorinated products from the separate stages; for example, a part of the necessary quantity of chlorine may be admitted to the propane and permitted to react therewith, and then an additional quantity of chlorine added to react upon a further portion of the propane, and then a further quantity of chlorine added to complete the reaction, with the recovery of the chlorinated products at the intermediate stages if desired, or the recovery of the chlorinated products may be delayed until the reaction is complete.

The propane containing substance may be separately heated, or the chlorine may be separately heated, or the two reacting substances may be heated together. Preferably, the process is practiced by providing a series of glass reaction vessels of standard types, passing the propane continuously through all of the vessels, and admitting measured quantities of chlorine gas into each vessel. The latter process provides a satisfactory means for the regulation of the temperature and for obtaining the optimum conditions of reaction in each vessel. The evolved hydrochloric acid gas may be absorbed in any suitable manner, for example by water, or by other well-known methods, for example, refrigeration, etc. The excess of propane, or of lower propane chlorides, may be recovered and returned to the original body of propane for retreatment, or otherwise disposed of. The temperatures of the several reaction vessels may vary between about 50° C. for the first vessel, and about 400° C. for the final vessel. The reaction is preferably carried out in the presence of a suitable catalyst in each vessel, for example, a polyvalent metal chloride, such as cupric chloride, ferric chloride, antimony pentachloride, etc. The catalyst may be supported upon an inert carrier or it may be agitated and maintained in suspension by any suitable means, and is preferably maintained at a temperature of from 200° to 350° C.

When liquefied propane is chlorinated, or liquefied propane and monochlorpropane, the operation is conducted under sufficient pressure to maintain the propane, or hydrocarbons containing the propane, in the liquid state. Ordinary propane may be liquefied under pressures of above 300 pounds per square inch at temperatures at which its chlorination is preferably effected.

When propane is chlorinated, the reactions are assumed to proceed as follows—

$$C_3H_8 + Cl_2 = C_3H_7Cl + HCl$$
$$C_3H_7Cl + Cl_2 = C_3H_6Cl_2 + HCl$$
$$C_3H_6Cl_2 + Cl_2 = C_3H_5Cl_3 + HCl$$

After chlorination has taken place to the desired degree, the gaseous mixture obtained may be cooled and the desired constituents fractionally condensed and further purified as deemed necessary. The lesser chlorinated fractions may be returned to the chlorinating system at the appropriate point for further development into polychlorpropanes. Any exit gases, after scrubbing with water to remove hydrochloric acid, may be returned to the chlorinating system or otherwise disposed of.

When dichlorpropane is further chlorinated, the chlorine is passed through the boiling liquid, preferably, but not necessarily, in the presence of actinic rays, such as sunlight; thus—

7500 grams of 1.2 dichlorpropane (sp. g. 1.16) was boiled under a reflux condenser in sunlight, and chlorine passed through until the specific gravity reached 1.342 at 20° C.; the evolved hydrochloric acid gas being absorbed in water. The product was neutralized by thoroughly agitating with 25 grams of sodium carbonate, and then filtered. On fractional distillation, the following fractions were obtained—

(1) 750 grams 1.2 dichlorpropane containing some trichlorpropane, sp. g. 1.201.

(2) 8025 grams trichlorpropane (sp. g. 1.366) boiling range 120° C. to 161° C.

Fraction No. 1 may be returned to the system for further chlorination.

Fraction No. 2 is a product which may be used as a solvent, and is particularly effective as a dry cleaning agent in accordance with this invention.

The product is composed of a mixture of the isomeric trichlorpropanes and varying minor amounts of tetrachlorpropanes.

A typical specific gravity is 1.366 at about 20° C.
A typical boiling range is 120° C. to 160° C.
A typical chlorine content is from about 68% to about 75%. This mixture is a clear, colorless liquid with a mild ethereal odor. It is much less toxic than carbon tetrachloride, and is a non-inflammable, and non-hazardous material. When used as a dry cleaning agent on fabrics, the solvent or other action on the fabric is very small, much less than that with carbon tetrachloride, cleaner's naphtha, Stoddard solvent, or other cleaning agents in common use. It is less corrosive to metals in the presence of moisture than carbon tetrachloride.

The propane trichloride made as described herein may be used directly as a dry cleaning agent, or may be mixed with other dry cleaning solvents, such, for example, as petroleum naphthas or fractions boiling between 65° and 110° C. A number of such compositions have been prepared, having boiling points from about 76° C. to about 162° C. One which is highly efficient may be prepared as follows—

|  | Per cent by volume |
|---|---|
| Trichlorpropane mixture | 75 |
| Solvent naphtha "B" | 6.25 |
| Carbon tetrachloride | 18.75 |

Another highly efficient dry cleaning composition may contain olefine or other unsaturated hydrocarbon chlorides, for example—

|  | Per cent |
|---|---|
| Trichlorpropane | 10 to 65 |
| Either or both ethylene dichloride or propylene dichloride | 5 to 50 |
| Carbon tetrachloride | 15 to 85 |

Other efficient dry cleaning compositions may contain—

|  | Per cent |
|---|---|
| Trichlorpropane | 85 to 15 |
| Carbon tetrachloride | 15 to 85 |

Also—

|  | Per cent |
|---|---|
| Trichlorpropane | 15 to 85 |
| Propylene dichloride | 10 to 50 |
| Carbon tetrachloride | 10 to 50 |

Also—

|  | Per cent |
|---|---|
| Tetrachlorpropane | 15 to 85 |
| Petroleum naphtha | 85 to 15 |

Also—

|  | Per cent |
|---|---|
| Trichlorpropane | 15 to 85 |
| Tetrachlorpropane | 10 to 50 |
| Tetrachloride of carbon | 10 to 50 |
| Petroleum naphtha | 10 to 30 |

The above percentages are indicative of variations in compositions which have been found to be highly efficient as dry cleaners in accordance with this invention.

The above compositions meet all of the requirements of the Underwriters' Laboratories for non-inflammable and non-hazardous dry cleaning agents.

The process of dry cleaning a fabric is preferably practiced by first removing prominent "spots" of grease, or other soiled "spots" on the fabric by rubbing the dry cleaning agent on the "spot" with a cloth, etc., and then immersing the fabric in a body of the dry cleaning agent and agitating or splashing the fabric and agent about for a few minutes, then removing and gently pressing the fabric without "wringing" to express most of the solvent therefrom, and then hanging the fabric in the air to dry. The dry fabric will be found to be uninjured by the treatment, and will have been thoroughly cleaned.

Although I have described preferred embodiments of my invention, it will be understood that modifications may be made within the spirit and scope of the appended claims.

I claim:—

1. A dry cleaning agent consisting of 15 to 85% of carbon tetrachloride mixed with 85 to 15% of a trichlorpropane.

2. A dry cleaning agent consisting of 15 to 85% of carbon tetrachloride, 10 to 65% of a trichlorpropane, and 5 to 50% of ethylene dichloride.

3. A dry cleaning agent consisting of 15 to 85% of carbon tetrachloride, 10 to 65% of trichlorpropane, and 5 to 50% of propylene dichloride.

4. A dry cleaning agent comprising a liquid containing from 15 percent to 85 percent of a polychlorpropane having at least three, and not more than four, atoms of chlorine in its molecule, and from 85 percent to 15 per cent of a petroleum naphtha fraction boiling between 65° C. and 110° C.

5. A dry cleaning agent comprising a liquid containing from 15 percent to 85 percent of trichlorpropane, from 10 percent to 50 percent of tetrachlorpropane, and from 10 percent to 30 percent of a petroleum naphtha fraction boiling between 65° C. and 110° C.

6. A dry cleaning agent comprising a liquid containing from 15 percent to 85 percent of trichlorpropane, from 10 percent to 50 percent of tetrachlorpropane, from 10 percent to 50 percent of carbon tetrachloride, and from 10 percent to 50 percent of a petroleum naphtha fraction boiling between 65° C. and 110° C.

7. A dry cleaning agent, comprising a liquid containing from 15 percent to 85 percent of a polychlorpropane having at least three, and not more than four, atoms of chlorine in its molecule, from 10 percent to 50 percent of tetrachloride of carbon, and from 10 percent to 30 percent of a petroleum naphtha fraction boiling between 65° C. and 110° C.

8. A dry cleaning agent, comprising a liquid containing from 15 percent to 85 percent of carbon tetrachloride, from 5 percent to 50 percent of propylene dichloride, from 10 percent to 65 percent of a trichlorpropane, from 5 percent to 50 percent of ethylene dichloride, and a petroleum naphtha fraction boiling between 65° C. and 110° C.

9. A dry cleaning agent comprising a liquid containing from 15 to about 85% of carbon tetrachloride, from 10 to about 65% of a trichlorpropane, and from 5 to about 50% of ethylene dichloride, and a petroleum naphtha fraction boiling between 65° C. and 110° C.

10. A dry cleaning agent comprising a liquid containing from 15 to about 85% of carbon tetrachloride, from 10 to about 65% of a trichlorpropane, and from 5 to about 50% of propylene dichloride and a petroleum naphtha fraction boiling between 65° C. and 110° C.

11. A dry cleaning agent comprising a liquid containing from 15 to about 85% of carbon tetrachloride, from 10 to about 65% of a trichlorpropane, and from 5 to about 50% of a liquid consisting of ethylene dichloride and propylene dichloride, and a petroleum naphtha fraction boiling between 65° C. and 110° C.

12. A dry cleaning agent comprising a liquid containing from 15 percent to about 85 percent of carbon tetrachloride, from 85 percent to about 15 percent of a trichlorpropane, and a petroleum naphtha fraction boiling between 65° C. and 110° C.

13. A dry cleaning agent comprising a liquid containing from 15 percent to 85 percent of trichlorpropane, from 10 percent to 50 percent of propylene dichloride, and from 10 percent to 50 percent of carbon tetrachloride.

WILLIAM E. SHARP.